United States Patent [19]

Bailey et al.

[11] Patent Number: 5,040,485
[45] Date of Patent: Aug. 20, 1991

[54] AUTOMATIC CAR WASH SYSTEM

[75] Inventors: James Bailey, Smithfield, Tex.; Brad Mitchell, Mt. Juliet, Tenn.; Jerry Chance; Bernie Nold, both of Ashland, Ohio

[73] Assignee: National Pride Co., Chicago, Ill.

[21] Appl. No.: 484,228

[22] Filed: Feb. 23, 1990

[51] Int. Cl.⁵ .............................................. B60S 3/04
[52] U.S. Cl. ............................... 118/680; 118/323; 134/57 R; 134/123; 239/751
[58] Field of Search ............... 134/45, 57 R, 123, 172, 134/180, 181; 239/751; 118/680, 323

[56] References Cited

U.S. PATENT DOCUMENTS

| | | | |
|---|---|---|---|
| 3,299,901 | 1/1967 | Axe et al. ............................ | 134/123 |
| 3,400,725 | 9/1968 | Miller et al. ....................... | 134/123 X |
| 3,421,526 | 1/1969 | Alkire et al. ...................... | 134/123 X |
| 3,543,774 | 12/1970 | Trasp ................................. | 134/123 X |
| 3,595,250 | 7/1971 | Hurst .................................. | 134/45 |
| 3,645,282 | 2/1972 | Kurronen .......................... | 134/45 |
| 3,786,823 | 1/1974 | Wiley ................................. | 134/45 |
| 4,852,593 | 8/1989 | Daugherty ....................... | 134/123 X |
| 4,913,357 | 4/1990 | Bolyard et al. ................... | 239/751 |

Primary Examiner—Philip R. Coe
Attorney, Agent, or Firm—Robert S. Beiser

[57] ABSTRACT

A simplified automatic car wash system is disclosed which comprises a linear trolley suspended from the upper structure of a car wash building and a cross trolley transversely mounted thereto. A spray arm is rotatably mounted to a glider plate on the cross trolley and the spray arm is used to deliver soap and water to an automobile. The spray arm is the only cleaning apparatus utilized, there being no need for rotating brushes and the like. As such, the only elements which come and in contact with the automobile during a car wash, are soap and water.

20 Claims, 4 Drawing Sheets

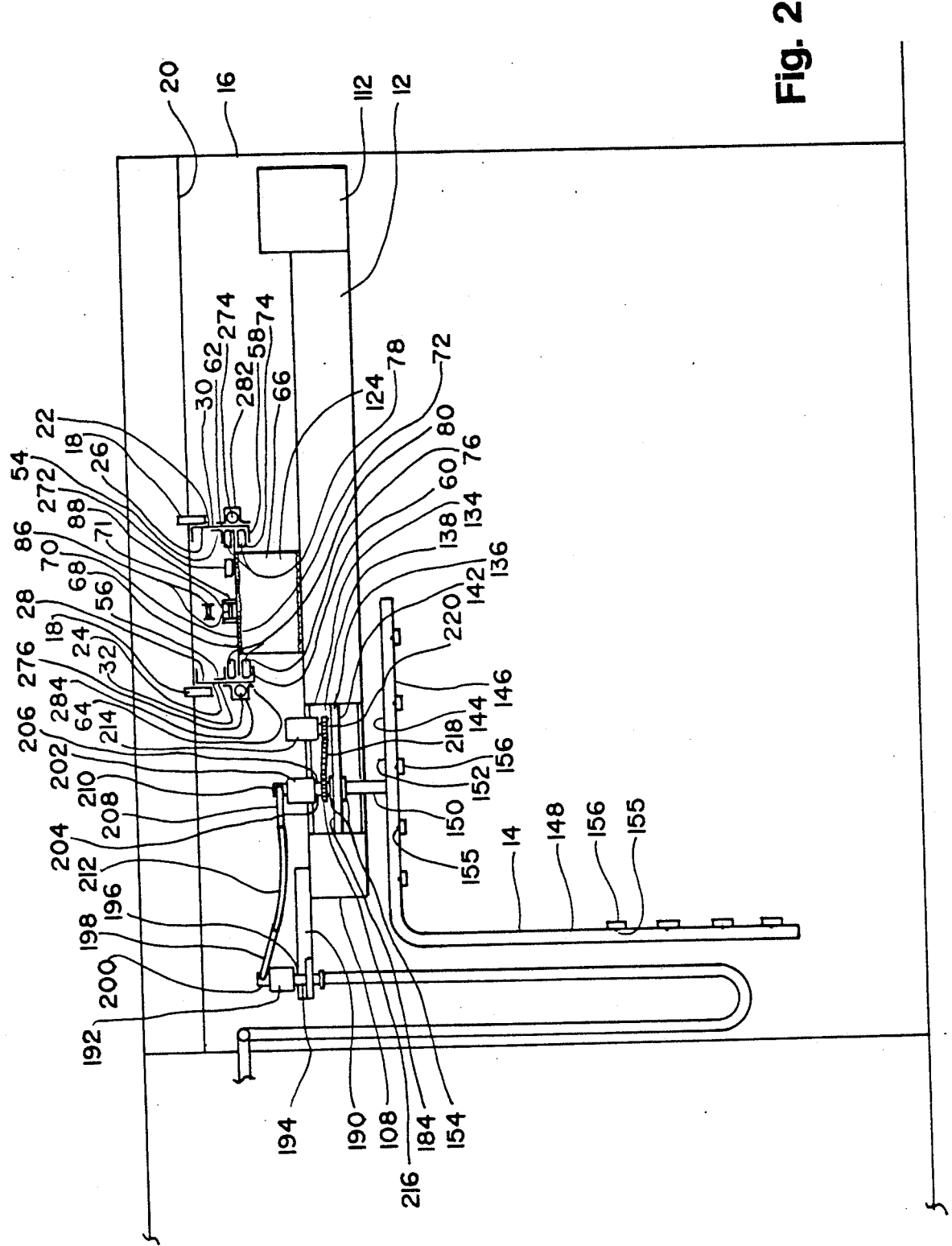

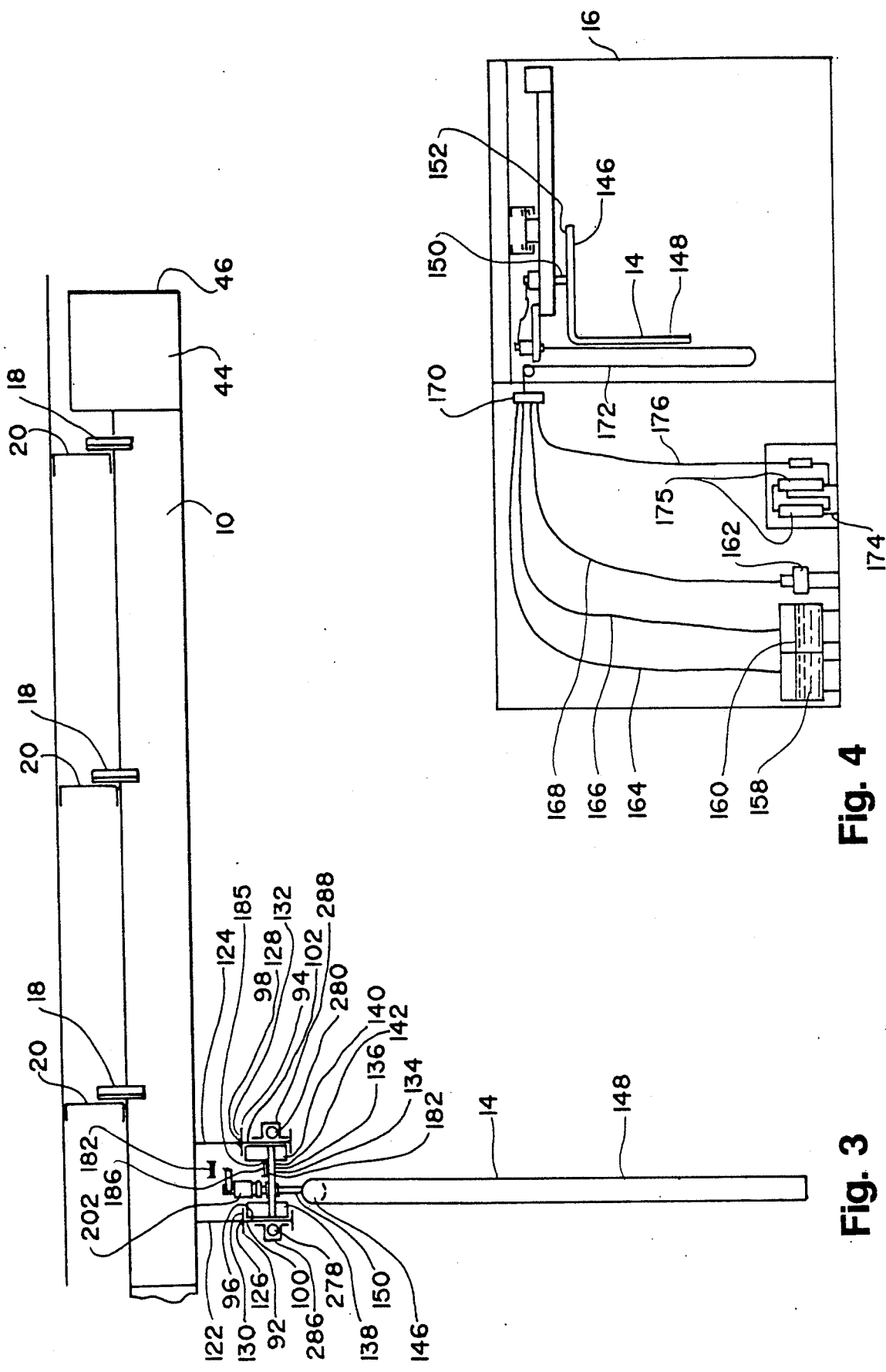

AUTOMATIC CAR WASH SYSTEM

BACKGROUND OF THE INVENTION

1. Field of the Invention

The present invention relates generally to a car wash system and more particularly to an automatic car wash which is suspended from the ceiling of a car wash bay and which may be utilized during sub-freezing weather.

2. Prior Art

A variety of car washing systems are known in the art including both the automatic and manual type. Typically, in an automatic car wash system of the prior art, a car is pushed or pulled via rollers through a path of various cleaning mechanisms including brushes, scrubbers, sprayers and dryers. Automatic systems of this type have several inherent problems including the necessity of replacing or adjusting the roller system used to advance the car through the car wash, and continual maintenance of the many washing components associated with such a system. Another problem inherent with automatic systems known in the art is the great many cleaning mechanisms required in order to achieve a quality car wash. Further, damage to cars often results in systems of this type. For example, side molding and antennas can easily be damaged or ripped from an automobile by the force of the powerful rotary type brushes against the automobile. Additionally, the paint finish is easily scratched or otherwise marred from the contact of brushes and other apparatus against the automobile.

Some of the problems inherent in automatic systems known in the art have been overcome by simple easy to use self cleaning car wash systems, wherein the owner of the vehicle to be washed uses a powerful high pressure spray to manually wash the car inside of a car wash bay. The obvious disadvantage to this type of system is that it requires the manual efforts of the car owner rather than the automobile being washed automatically.

A further disadvantage with both types of systems known in the prior art is their inability to be operated during very cold weather. In such systems, when temperatures reach below freezing, the water quickly freezes, thereby clogging water nozzles and freezing various other apparatus.

There is therefore a need for an automatic car wash system which overcomes the above disadvantages and also delivers a high quality car wash.

SUMMARY OF THE INVENTION

It is therefore an object of the present invention to provide a simplified automatic car wash system which does not require a number of different cleaning mechanisms.

It is a further object of the present invention to provide an automatic car wash system which can be utilized in sub-freezing temperatures.

It is a further object of the present invention to provide an automatic car wash system which requires little maintenance and upkeep.

It is a further object of the present invention to eliminate the possibility of damage to an automobile caused by cleaning mechanisms coming in contact therewith.

It is a further object of the present invention to provide an automatic car wash system which provides a high quality car wash.

In accordance with this invention, there is provided an automatic car wash system essentially comprising a linear trolley suspended from the upper structure of the car wash building and a cross trolley transversely mounted thereto. A spray arm rotatably mounted to a glider plate on the cross trolley is used to deliver soap and water to an automobile under both low and high pressure, thereby washing the automobile. The spray arm is in the shape of an inverted L having a horizontal bar and a vertical bar. Soap and water are pumped through a plurality of apertures in the spray arm and onto the automobile. The spray arm is supplied with soap and water through a supply hose. The spray arm is the only cleaning apparatus utilized, there being no need for rotating brushes and the like. As such, the only elements which come in contact with the automobile are soap and water.

When the system is in operation, an automobile is situated below the linear and cross trolleys. At that time, the spray arm is located at the front left corner of the automobile. The cross trolley then begins to move along the linear trolley toward the back end of the automobile, and the spray arm attached to the glider plate of the cross trolley delivers soap to the top and left side of the automobile. When the cross trolley reaches the end of the linear trolley, the cross trolley stops moving and the spray arm is then rotated ninety degrees. The glider plate associated with the cross trolley then begins to move toward the right side of the automobile, and the spray arm attached to the glider plate of the cross trolley delivers soap to the top and back end of the automobile. When the glider plate reaches the end of the cross trolley, the glider plate stops moving and the spray arm is again rotated ninety degrees. The cross trolley once again begins to move along the linear trolley, this time toward the front of the automobile and the spray arm attached to the glider plate of the cross trolley delivers soap to the top and right side of the automobile. When the cross trolley reaches the opposite end of the linear trolley the cross trolley stops moving and the spray arm is again rotated ninety degrees. The glider plate then begins to move toward the left side of the automobile and the spray arm delivers soap to the top and front of the automobile. When the glider plate reaches the opposite end of the cross trolley, the glider plate stops moving and the spray arm is once again rotated ninety degrees, thereby bringing the spray arm back to its starting position. This sequence is repeated several times delivering soap or water under low or high pressure to the automobile until the cleaning cycles are over, and the car is thus clean.

An apparatus comprising rotatable swivel unions interconnected by a combination of rigid and flexible tubing is used to deliver the soap and water to the spray arm. Such an apparatus has been found to be critical in order to prohibit supply hoses or tubing from knotting, tangling or being ripped by the movement of the trollies, yet still allows flexibility when the cross trollies or glider plate are in motion.

The foregoing and other objects, features and advantages of the invention will be apparent from the following more particular description of the embodiments of the invention as illustrated in the accompanying drawings.

BRIEF DESCRIPTION OF THE DRAWINGS

FIG. 2 is a cross sectional view taken along line A—A of FIG. 1, and illustrating the car wash system of the present invention.

FIG. 3 is a cross sectional view taken along line B—B of FIG. 1, and illustrating the car wash system of the present invention.

FIG. 4 is a schematic view illustrating the supply system of the present invention.

DETAILED DESCRIPTION OF THE PREFERRED EMBODIMENT

Figure 1:
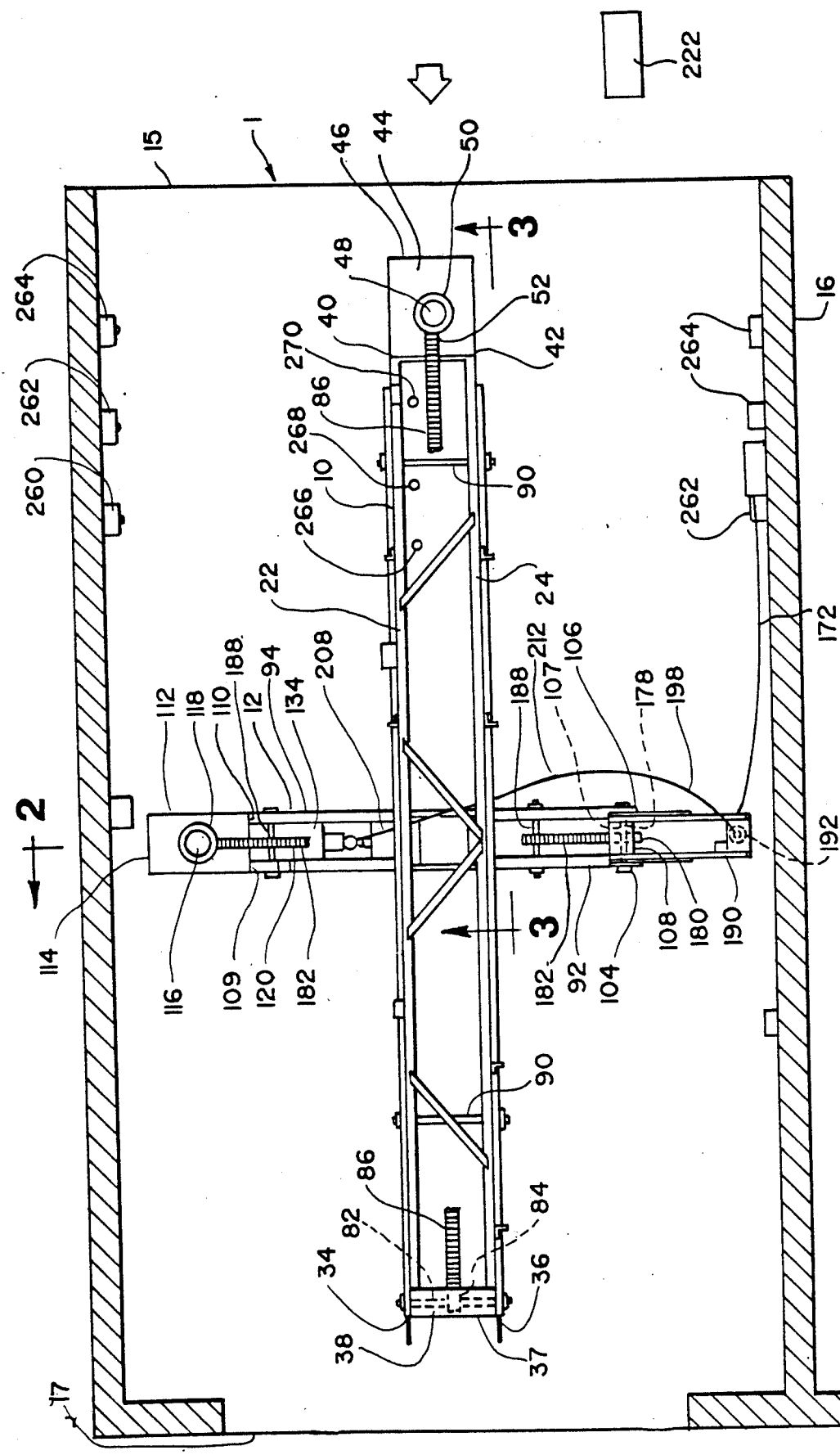
FIG. 1 is a plan view illustrating the car wash system of the present invention.

As will be described in detail below, the automatic car wash system 1 of the present invention comprises three main components, those being a linear trolley 10, a cross trolley 12, and a spray arm 14. A car wash bay 16 houses these components. As illustrated in FIGS. 1, 2 and 3, linear trolley 10 is suspended overhead, proximate to the longitudinal center of car wash bay 16, and is supported by angle type brackets 18 extending downward from the roof trusses 20 of car wash bay 16. Although heavy gauge angle brackets 18 are preferred, other hanging brackets or mounting apparatus may be used in alternative embodiments, so long as they provide adequate stability and structural rigidity to cross trolley 12.

Linear trolley 10 is rectangular in shape and extends substantially from the entrance 15 of car wash bay 16 to the exit 17 of car wash bay 16. Linear trolley 10 is preferably constructed of aluminum C-channels comprising its right 22 and left 24 sides as viewed from the entrance of car wash bay 16.

As best illustrated in FIGS. 1 and 2, right side 22 and left side 24 of linear trolley 10 have a interior face 26 and 28, respectively, and an exterior face 30 and 32, respectively. The distal ends 34 and 36 of right side 22 and left side 24, respectively, are joined by a plate 37, or channel which is bolted or welded thereto, thereby forming the back end 38 of linear trolley 10. Proximal ends 40 and 42 of right side 22 and left side 24, respectively, are joined by a box-like configuration 44 constructed of aluminum. Box 44 forms the front end 46 of linear trolley 10, and houses a motor 48, sprocket 50 and electrical components associated therewith. Motor 48 and sprocket 50 comprise part of drive chain 52 of linear trolley 10, which drives cross trolley 12 reciprocally between back end 38 and front end 46 of linear trolley 10, which will be more fully described below.

Right side 22 and left side 24 of linear trolley 10 have angle brackets 54 and 56 bolted or otherwise attached to interior face 26 and 28 thereof, respectively. Angle bracket 54 and bottom flange 58 of right side 22 form channel 62 and angle bracket 56 and bottom flange 60 of left side 24, form channel 64. The upper housing 66 of cross trolley 12 fits within channels 62 and 64, thereby guiding cross trolley 12 reciprocally between back 38 and front 46 of linear trolley 10 through channels 62 and 64.

Upper housing 66 of cross trolley 12 comprises an aluminum plate 68, arranged in a horizontal plane. Attached to the top 70 and bottom 72 and at the right 74 and left 76 ends of aluminum plate 68 are glider blocks 78 and 80, respectively. Glider blocks 78 and 80 are arranged within channels 62 and 64, respectively, thereby providing a connection between upper housing 66 and thus cross trolley 12 with linear trolley 10.

An axle 82 is located proximate to the back end 38 and between right side 22 and left side 24 of linear trolley 10 and has a sprocket 84 fixedly attached thereto. Chain 86 extends between sprocket 50 and sprocket 84 in a looped arrangement and is further attached to top 70 of aluminum plate 68. Chain 86 may be attached to top 70 of aluminum plate 68 by bolting chain 86 between top 70 and fastening plate 71. With such an arrangement, when motor 48 is activated, chain 86 is revolved around sprockets 50 and 84, thereby driving cross trolley 12 from between back end 38 and front end 46 of linear trolley 10 within channels 62 and 64. It may be preferable to provide a slip clutch 88 attachment means for attachment of chain 86 to aluminum plate 68. In so doing, slip clutch 88 would allow the movement of cross trolley 12 to halt if a certain amount of resistance was felt. Such would be the case if cross trolley 12 became blocked. In such a circumstance, slip clutch 88 would release chain 86 from aluminum plate 68, thereby halting the movement of cross trolley 12 yet allowing chain 86 to continue to rotate. The obvious advantage being that motor 48 could continue to run without resistance thereby preventing motor burn out.

It may also be advantageous to locate one or more separators 90 between right side 22 and left side 24 at various distances along linear trolley 10. Separators 90 prohibit chain 86 from knocking against itself and further provides for adjusting slack in chain 86.

It has been found preferable to construct glide blocks 78 and 80 from either a high molecular weight (HMW) or ultra high molecular weight (UHMW) polyethylene material. High molecular weight polyethylenes are generally defined as linear, copolymer or homopolymer resins with weight average molecular weights in the range of 200,000 to 500,000. High density polyethylene resins have densities in the 0.941 to 0.965 grams per cubic centimeter range. However, most HMW polymer grades are copolymers in the density range of 0.944 to 0.954 grams per cubic centimeter.

Ultra high molecular weight polyethylene has polymer chains 10 to 20 times longer than high density polyethylene. The longer chains or higher molecular weight in ultra high molecular weight polyethylenes provides toughness, abrasion resistance and freedom from stress cracking. It also shares the lubricity, chemical resistance and excellent electrical properties of conventional high density polyethylenes. Other properties of great importance are abrasion resistance, low coefficient of friction, self lubrication, non-absorbency, ease of cleaning and resistance to boiling water. These properties make UHMW polyethylene particularly suitable for the application of the present invention. UHMW polyethylene is ten times more abrasion resistant than carbon steel, and also has low temperature toughness even when colder than liquid nitrogen. For these reasons, glider blocks 78 and 80 are constructed of high molecular weight or ultra high molecular weight polyethylene in the preferred embodiment. In an alternative embodiment rollers may be used, rather than glider blocks 78 and 80.

Cross trolley 12 will next be described as illustrated in FIGS. 1, 2 and 3. Cross trolley 12 is similar in structure to linear trolley 10, preferably being constructed of aluminum I-beam rails comprising its right 92 and left 94 sides. Although right 92 and left 94 sides of cross trolley 12 are described in the preferred embodiment as comprised of I-beams, other materials such as C-channels may also be used as in the case of linear trolley 10.

Further, I-beams, as used in cross trolley 12 may be used for right side 22 and left 24 of linear trolley 10.

As best illustrated in FIGS. 1 and 3, right side 92 and left side 94 of cross trolley 12 have an interior face 96 and 98, respectively, and an exterior face 100 and 102, respectively. The distal ends 104 and 106 of right side 92 and left side 94, respectively, are joined by a plate member 107 or channel which is bolted or welded thereto, thereby forming the back end 108 of cross trolley 12. Proximal ends 109 and 110 of right side 92 and left side 94, respectively, are joined by a box-like configuration 112 constructed of aluminum. Box 112 forms the front end 114 of linear trolley 12 and houses a motor 116, sprocket 118 and electrical components associated therewith. Motor 116 and sprocket 118 comprise part of drive chain 120 of cross trolley 12 which drives gliding apparatus 134 reciprocally between back end 108 and front end 114 of cross trolley 12, which will be more fully described below.

Cross trolley 12 is mounted beneath and transverse to linear trolley 10. Aluminum plate 68 of upper housing 66 has vertical side plates 122 and 124 welded, or otherwise attached thereto and extending downwardly therefrom. Bottoms 126 and 128 of vertical side plates 122 and 124 are respectively attached to tops 130 and 132 of right side 92 and left side 94 of cross trolley 12. In the preferred embodiment, vertical side plates 122 and 124 are welded or bolted to right side 92 and left side 94, respectively. Upper housing 66 is connected to linear trolley 10 as previously described.

Referring to FIGS. 2 and 3, a gliding apparatus 134 is illustrated comprising a plate 136 and glider blocks 138 and 140. In the preferred embodiment, glider blocks 138 and 140 are constructed of either HMW or UHMW polyethylene as described previously herein. Glider plate 136 is arranged in a horizontal plane and is attached to glider blocks 138 and 140 through slots in the center thereof. Glider blocks 138 and 140 with glider plate 136 therebetween are held against the interior face 96 and 98 respectively, of right side 92 and left side 94 respectively, of cross trolley 12. In an alternative embodiment, rollers may be used, rather than glider blocks 138 and 140.

The I-beam construction of right 92 and left 94 sides serve as a channel within which gliding apparatus 134 is guided. Mounted under glider plate 136 is spray arm 14. Spray arm 14 is constructed of metal tubing and is formed into an inverted L-shape having an upper horizontal bar 146 and a vertical bar 148. A short coupling tube 150 is attached to the top side 152 of horizontal bar 146 at one end and through a bearing mechanism 154 at its other end. Bearing mechanism 154 is mounted to glider plate 136 and further has a hole through its center. Therefore, mounting spray arm 14 to glider plate 136 by means of a coupling tube 150 through bearing mechanism 154, allows spray arm 14 to be rotated.

Horizontal bar 146 and vertical bar 148 of spray arm 14 further have a plurality of small openings 155, or apertures over which spray nozzles 156 are attached. When water or soap is pumped into spray arm 14, it exits through spray nozzles 156. The soap and water emitted through spray nozzles 156 on horizontal bar 146 are directed onto the top 232 of automobile 2, and soap and water emitted through spray nozzles 156 located on vertical bar 148 are directed onto the sides 234, 236, 238 and 240 of automobile 2, illustrated in FIG. 5.

In the preferred embodiment, two different cleaning agents and water are supplied to spray arm 14 for discharge onto an automobile 2. For this purpose, a separate supply of presoak detergent 158, wash detergent 160 and water 162 are necessary. As illustrated schematically in FIG. 4, supply hoses 164, 166 and 168 extend from a supply of presoak detergent 158, wash detergent 160 and water 162 respectively, to a manifold mechanism 170. Extending from manifold mechanism 170, to spray arm 14 is main supply hose 172. Check valves, (not shown), associated with each of supply hoses 164, 166 and 168, open and close in a specified cycle to allow the various fluids to separately pass through main supply hose 172 at predetermined times.

In an alternative embodiment, a treated water supply 174 is also used. Water supply 174 is treated as it passes through reverse osmosis filters 175, and is then pumped from supply hose 176 through manifold mechanism 170 and supply hose 172 into spray arm 14. Water supply 174 is used as a final rinse and dries spot free as a result of the reverse osmosis filter 175 treatment. Drying apparatus to quickly remove water from the automobile is unnecessary because the automobile dries spot free as the wind blows against the automobile as it is being driven.

Returning to FIGS. 1, 2 and 3, it is necessary to drive gliding apparatus 134 having spray arm 14 rotatably mounted thereto between front end 114 and back end 108 of cross trolley 12, in order to fully supply detergents 158 and 160 and water 162 to automobile 2. For this purpose, an axle 178 is located proximate to back end 108 and between right side 92 and left side 94 of cross trolley 12 and has a sprocket 180 fixedly attached thereto. Chain 182 extends between sprocket 118 and sprocket 180 in a looped arrangement and is further attached to top side 184 of glider plate 136. Chain 182 may be attached to top side 184 of glider plate 136 by bolting chain 182 between top side 184 and fastening plate 185. With such an arrangement, when motor 116 is activated, chain 182 is revolved around sprockets 118 and 180, thereby driving glider apparatus 134 reciprocally between back end 108 and front end 114 of cross trolley 12. It may be preferable to provide a slip clutch 186, attachment means for attachment of chain 182 to top side 184 of glider plate 136. In so doing, slip clutch 186 would allow the movement of gliding apparatus 134 to halt if a certain amount of resistance was felt. Such would be the case if gliding apparatus 134 became blocked. In such an instance, slip clutch 186 would release chain 182 from glider plate 136, thereby halting the movement of gliding apparatus 134, yet allowing chain 182 to continue to rotate. The obvious advantage being that motor 116 could continue to run without resistance, thereby preventing motor burn out.

It may also be advantageous to locate one or more separators 188 between right side 92 and left side 94 at various distances along cross trolley 12. Separators 188 prohibit chain 182 from knocking against itself and further provides for adjusting slack in chain 182.

As earlier described, gliding apparatus 134 having spray arm 14 rotatably mounted thereto, moves reciprocally between back end 108 and front end 114 of cross trolley 12. Further, cross trolley 12 moves reciprocally between back end 38 and front end 46 of linear trolley 10. As such, it is critical to the invention to provide an apparatus for supplying detergents 158 and 160 and water 162 to spray arm 14 in such a way as to allow the movement as described above. Therefore, in the preferred embodiment, an extension member 190 is provided on which a first rotatable swivel union 192 is mounted. Rigid coupling 194 passes through extension member 190 and into the bottom inlet 196 of swivel union 192. Rigid arm 198 extends outwardly from top outlet 200 of swivel union 192. A second rotatable swivel union 202 is mounted above bearing mechanism 154 of glider plate 136. A rigid coupling 204 extends from the bottom outlet 206 of swivel union 202 into the top of bearing mechanism 154. As such, swivel union 202 is located directly above and is in fluid connection with coupling tube 150 of spray arm 14. In the preferred embodiment, swivel unions 192 and 202 are as those manufactured by Dueblen, Inc.

Rigid arm 208 extends outwardly from top inlet 210 of swivel union 202, and flexible supply hose 212 interconnects rigid arm 198 with rigid arm 208. The combined lengths of rigid arm 198, flexible hose 212 and rigid arm 208 is slightly longer than the total distance traveled by gliding apparatus 134. As such, when gliding apparatus 134 begins to move away from back end 108 of cross trolley 12, swivel union 192 and swivel union 202 begin to rotate, thereby drawing rigid arm 198 and rigid arm 208 inward, thereby providing the necessary flexibility and distance required for movement.

The combination of swivel unions 198 and 202, rigid arms 198 and 208 and flexible hose 212, have been found to be critical in order to prohibit knotting or tangling which would occur if main supply hose 172 were coupled directly to spray arm 14. It was found that if supply hose 172 is coupled directly to either spray arm 14 or gliding apparatus 134, supply hose 172 often times interfered with the smooth movement of gliding apparatus 134, became hung up on cross trolley 12 as glider apparatus 134 was in motion, and became torn or ripped by the movement of gliding apparatus 134.

The apparatus described above overcomes these deficiencies and has been found to be critical to the operation of car wash system 1. Rigid arm 198 and rigid arm 208 decrease the amount of flexible hose needed, thereby eliminating the possibility of knotting and tangling, and flexible hose 212 and swivel unions 192 and 202 provide the flexibility necessary to allow movement of gliding apparatus 134.

The flow of detergents 158 and 160 and water 162 pass from their supply source to spray arm 14 through apparatus in the following order. Detergents 158, or 160, or water 162 enter supply hose 172, passing through rigid coupling 194 and into swivel union 192. It then exits swivel union 192 through rigid arm 198 and into flexible hose 212 where it thereafter enters rigid arm 208 and travels through swivel union 202 and rigid coupling 204 to coupling tube 150, and finally into spray arm 14 for delivery to automobile 2.

As best illustrated in FIG. 2, spray arm 14 is rotatably mounted to gliding apparatus 134, so that it may be rotated around automobile 2 during a washing cycle to insure that the entire surface of automobile 2 is thoroughly washed. In order to rotate spray arm 14, a motor 214 is mounted to glider plate 136 and has sprocket 220 fixedly attached to the shaft thereof. A sprocket 216 is fixedly attached to rigid coupling 204 beneath swivel union 202 and above bearing mechanism 154. Chain 218 extends between sprocket 216 and sprocket 220 in a looped arrangement. When spray arm 14 reaches an end of automobile 2, motor 214 is activated, thereby rotating sprockets 216 and 220 which in turn rotates spray arm 14 which is indirectly connected thereto. A quarter-turn limit switch (not shown) is provided to shut power off to motor 214 once spray arm 14 has been rotated ninety degrees. This sequence is carried out each time spray arm 14 reaches an end of automobile 2.

DESCRIPTION OF OPERATION

Figure 5:
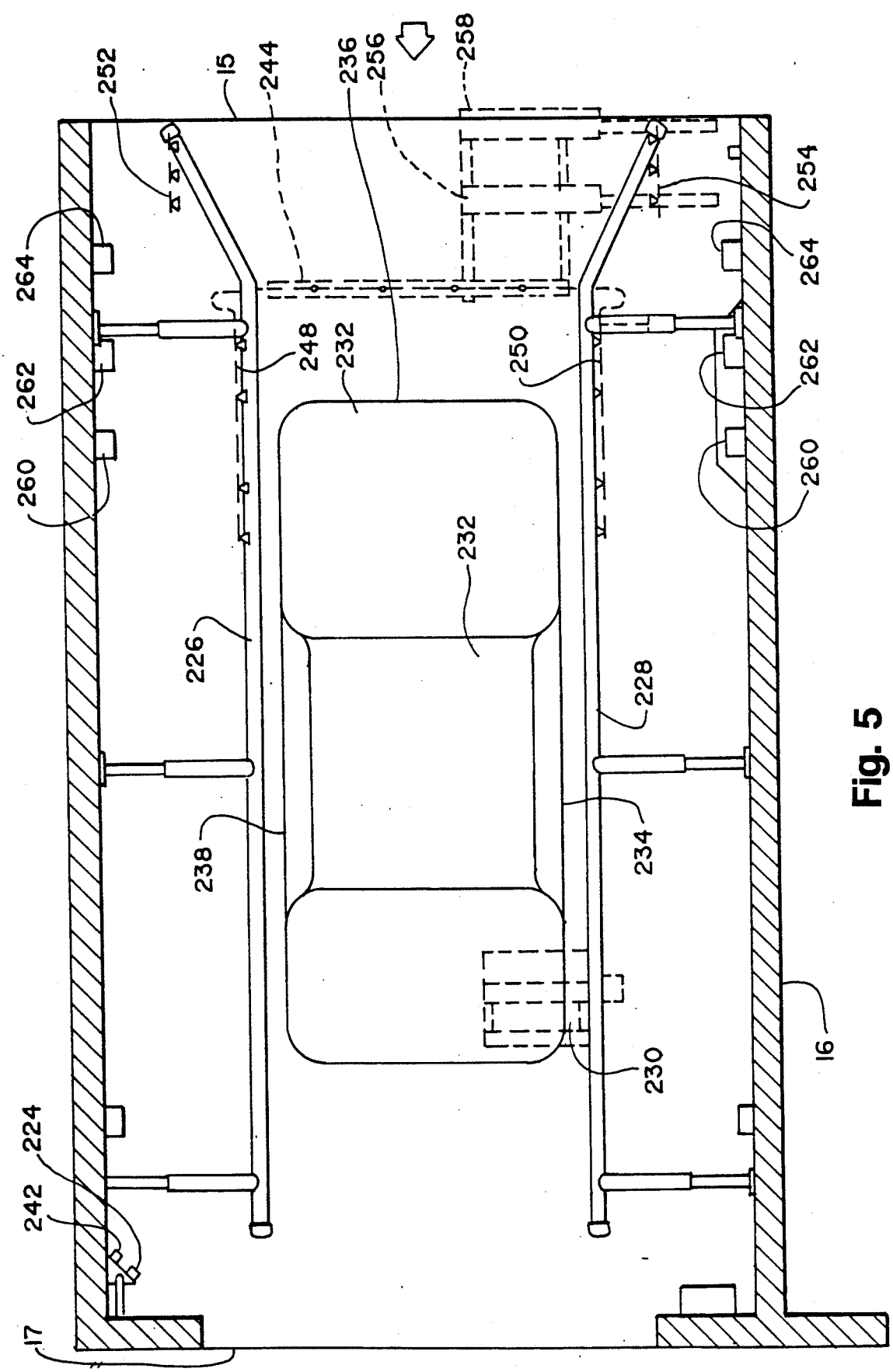
FIG. 5 is a plan view taken beneath the plane of the car wash system and illustrating an automobile within the car wash bay of the present invention.

As illustrated in FIGS. 1 and 5, as automobile 2 approaches entrance 15 of car wash bay 16, the operator must stop at pay station 222 to select the desired washing options and deposit the required fee associated with the option chosen. Pay station 222 may be either a manned pay booth, or may be of the automatic variety. After making ones pay selection at pay station 222 and depositing the fee associated therewith, the operator of automobile 2 drives into car wash bay 16 and indicator light 224 within car wash bay 16 signals the operator when to stop. Guide rails 226 and 228 are used to assist the operator of automobile 2 in centering automobile 2 under linear trolley 10. Treadle plate 230 is landed on by the front left tire (not shown) of automobile 2 which activates indicator light 224, signaling the operator of automobile 2 to come to a stop and also transmits a signal to begin the operation of car wash system 1.

At the beginning of a wash, spray arm 14 is in its start position at the front left corner of automobile 2. In its first cycle around automobile 2, spray arm 14 delivers hot water presoak detergent 158 to automobile 2 under low pressure. Presoak detergent 158 used in this cycle has a pH level of approximately 11. Motor 48 is activated and drive chain 52 is set in motion, thereby driving cross trolley 12 along linear trolley 10 to the front end 46 thereof. As cross trolley 12 is in motion, spray arm 14 delivers presoak detergent 158 to the top 232 and left side 234 of automobile 2. When cross trolley 12 reaches front end 46 of linear trolley 10, motor 48 is deactivated, thus halting the movement of cross trolley 12. Motor 214 is then activated, thus rotating spray arm 14 ninety degrees. Once spray arm 14 has been rotated ninety degrees, motor 214 is deactivated and motor 116 becomes activated.

Motor 116 sets drive chain 120 in motion, thereby driving gliding apparatus 134 toward front end 114 of cross trolley 12. As gliding apparatus 134 is in motion, spray arm 14 delivers presoak detergent 158 to top 232 and back 236 of automobile 2. When gliding apparatus 134 reaches front end 114 of cross trolley 12, motor 116 is deactivated, thereby halting the movement of gliding apparatus 134.

Motor 214 is again activated and rotates spray arm 14 ninety degrees, after which time motor 214 is deactivated. Motor 48 is then activated once again, but in reverse direction, thereby driving cross trolley 12 along linear trolley 10 toward back end 38 of linear trolley 10. As cross trolley 12 is in position, spray arm 14 delivers presoak detergent 158 to top 232 and right side 238 of automobile 2. When cross trolley 12 reaches back end 38 of linear trolley 10, motor 48 is deactivated thus halting the movement of cross trolley 12.

Motor 214 is again activated and rotates spray arm 14 ninety degrees after which time motor 214 is deactivated. Motor 116 is then activated once again, but in reverse direction, thereby driving gliding apparatus 134 toward back end 108 of cross trolley 12. As gliding apparatus 134 is in motion, spray arm 14 delivers presoak detergent to top 232 and front 240 of automobile 2. When gliding apparatus 134 reaches back end 108 of cross trolley 12, motor 116 is deactivated, thereby halting the movement of gliding apparatus 134. Motor 214 is again activated and rotates spray arm 14 ninety degrees, after which time motor 214 is deactivated.

After completing this sequence, spray arm 14 is back in the position from which it started and a second cycle begins. A complete car wash comprises either four or five cycles which are identical to the cycle described in detail above. However, each cycle is used to deliver a different element to automobile 2. During cycle two, spray arm 14 delivers hot water wash detergent 160 to automobile 2 under low pressure. Wash detergent 160 used in this cycle has a pH level of approximately 8. During cycle three, spray arm 14 delivers cold water 160 as a rinse, to automobile 2 under high pressure. In an alternative embodiment, wax may also be delivered to automobile 2 during cycle three. During cycle four, spray arm 14 delivers cold water 160 as a rinse to automobile 2 under high pressure. In an alternative embodiment, there is a fifth cycle. During cycle five, spray arm 14 delivers water 174 as a spot free rinse to automobile 2 under low pressure. Water 172 used during cycle five is treated through reverse omosis filters 175.

At the completion of all the cycles, indicator light 242 signals the operator of automobile 2 that the car wash is over. At this time, automobile 2 is driven from car wash bay 16 through exit 17. In the preferred embodiment, the complete operation of car wash system 1 as described herein is controlled by a programmable controller.

Optional spray devices may also be supplied in alternative embodiments, such as under carriage spray arm 244, rocker panel spray arms 248 and 250, and tire spray arms 252 and 254, as illustrated in FIGS. 1 and 5. When these cleaning options are in place, automobile 2 will be driven over treadle plate 256 thereby activating under carriage spray arm 244 and rocker panel spray arms 248 and 250. Automobile 2 will also be driven over treadle plate 258, thereby activating tire spray arms 252 and 254. These are optional features which are not critical to the present invention.

Because automobiles come in a variety of sizes, it is desirable to enable spray arm 14 to adjust for automobiles of different lengths. As such, a first 260, second 262 and third 264 set of electronic optical sensors are provided which sense the length of automobile 2 within car wash bay 16. Associated with sets of electronic optical sensors 260, 262 and 264, are proximity switches 266, 268 and 270. When automobile 2 is in its resting position within car wash bay 16, each set of electronic optical sensors 260, 262 and 264 are activated to determine the length of automobile 2. If none of the sets of electronic optical sensors 260, 262 and 264 sense the rear end of the car, proximity switch 266 becomes activated. A metallic bar 272 is fixedly attached to aluminum plate 68 of upper housing 66 of cross trolley 12. As cross trolley 12 is driven toward front end 46 of linear trolley 10, metallic bar 272 will cross under proximity switch 266 thereby activating it. Proximity switch 266 then signals motor 48 to deactivate, thereby halting movement of cross trolley 12. As such, spray arm 14 is in close proximity to back 236 of automobile 2, rather than cross trolley 12 being driven all of the way to front end 46 of linear trolley 10.

If electronic optical sensor set 260 reads that a car is across its vertical plane, but electronic optical sensor sets 262 and 264 do not sense automobile 2, proximity switch 268 is activated and movement of cross trolley 12 will be halted when metallic bar 272 passes under proximity switch 268. If electronic optical sensor sets 260 and 262 both sense automobile 2 across their respective vertical planes, but not electronic optical sensor set 264, proximity switch 270 is activated and cross trolley 12 will stop moving when metallic bar 272 passes under proximity switch 270.

If each set 260, 262 and 264 of electronic optical sensors sense the presence of automobile 2 across their respective vertical planes, this indicates that automobile 2 is too long for car wash system 1 and thus car wash system 1 will be inhibited from operating. In alternative embodiments one or more sets of optical sensors and proximity switches such as, optical sensor set 290 and proximity switch 292, may also be provided to automatically adjust spray bar 14 at front end 240 of automobile 2.

Car wash system 1 of the present invention is for use year round. Therefore, where the car wash system of the present invention is to be installed in geographic areas where the climate reaches below freezing temperatures, provisions are made to prohibit spray nozzles 156 and other apparatus from becoming clogged or blocked from ice formation.

As illustrated in FIGS. 2 and 3, radiant heating tubes 274, 276, 278 and 280 are installed along the length of right side 22, left side 24 of linear trolley 10 and right side 92 and left side 94 of cross trolley 12, respectively. Aluminum shield plates 282, 284, 286 and 288 are installed over each of radiant heating tubes 274, 276, 278 and 280, respectively, and serve to protect and insulate radiant heating tubes 274, 276, 278 and 280. In an alternative embodiment, radiant heating tubes 274, 276, 278 and 280 may be further insulated with silicon. Antifreeze water is circulated through the radiant heating tubes 274, 276, 278 and 280 and the heat radiated therefrom warms both cross trolley 12, linear trolley 10 and various apparatus associated therewith to prohibit ice from forming thereon when sprayed with water.

In order to keep spray nozzles 156 from becoming clogged with ice, water is pumped into spray arm 14 and out of spray nozzles 156 on very low pressure during periods of system inoperation. Because water continues to flow through spray nozzles 156 during periods of inoperation, ice may not form thereon. Pumping water through spray nozzles 156 and heating linear trolley 10 and cross trolley 12 with radiant heating tubes 274, 276, 278 and 280, allow car wash system 1 of the present invention to be utilized in sub-freezing temperatures.

Further, car wash system 1 of the present invention is comprised almost entirely of aluminum or stainless steel parts in the preferred embodiment. Metallic parts not available in stainless or aluminum may be plated with cadmium or other rust proof plating material. As such, car wash system 1 is not susceptible to rust, therefore reducing maintenance.

The foregoing description and drawings merely explain and illustrate the invention, and the invention is not limited thereto except insofar as those who have the disclosure before them are able to make modification and variations therein without departing from the scope of the invention.

I claim as my invention:

1. An automatic washing system for washing vehicles comprising:
   a trolley system below which one of said vehicles to be washed is positioned, said trolley system comprising an overhead stationary linear trolley having first and second ends and a cross trolley having first and second ends transversely mounted to said linear trolley for back and forth movement between said first and second ends of said linear trolley;

said cross trolley having a glider plate mounted thereto wherein said glider plate has a spray arm rotatably connected to said glider plate and wherein said glider plate moves back and forth between said first and second ends of said cross trolley;

said cross trolley further comprising fluid connector means between said first end of said cross trolley and said glider plate, said fluid connector means comprising a first swivel connect fixedly attached to said first end of said cross trolley, a second swivel connect fixedly attached to said glider plate and a connection therebetween, wherein said connection provides flexibility and rigidity as said glider plate travels back and forth between said first and second ends of said cross trolley, and wherein said first swivel connect is further connected to a primary supply hose for supply of soap and water to said spray arm for washing said vehicle.

2. The washing system as described in claim 1, wherein said spray arm comprises a length of metal tubing constructed and arranged in an inverted L-shape, and having a vertical bar member and a horizontal bar member wherein each of said bar members has a plurality of apertures disposed thereon for spraying said soap and water on said vehicle.

3. The washing system as described in claim 2, wherein said horizontal bar member of said spray arm has a shaft extending upwardly therefrom and wherein said shaft connects to a rotator means for said rotatable connection.

4. The washing system as described in claim 2, wherein said water is supplied to said spray bar at low pressure during periods of inoperation to prohibit said apertures from freezing shut when outside temperatures are below 32 degrees Fahrenheit.

5. The washing system as described in claim 1, wherein said system further comprises a plurality of sources of cleaning agents and further comprising a water source wherein each of said sources has a secondary supply hose associated therewith for conveying said cleaning agents and said water to said primary supply hose.

6. The washing system as described in claim 5, wherein each of said secondary supply hoses is connected to a manifold, wherein said primary supply hose has first and second ends and wherein said first end of said primary supply hose is also connected to said manifold, and said second end of said primary supply hose is connected to said first swivel connect fixedly attached to said first end of said cross trolley.

7. The washing system as described in claim 1, wherein said washing system further comprises:
(a) means for choosing a wash cycle and depositing a fee associated with said chosen wash cycle,
(b) means for permitting the passage of a vehicle into a car wash bay,
(c) means for applying a presoak of high pH detergent to said vehicle under low pressure,
(d) means for applying a washing low pH detergent to said vehicle under low pressure,
(e) means for applying a high pressure rinse of water to said vehicle.

8. The washing system as described in claim 7, wherein said system further comprises means for applying a second high pressure rinse comprising wax and water to said vehicle.

9. The washing system as described in claim 7, wherein said wash further comprises means for applying a spot free rinse of water wherein said water is treated through a reverse osmosis filter.

10. The washing system as described in claim 1, wherein said system further comprises radiant heating tubes running along each side of said linear trolley and said cross trolley to prohibit ice from forming on said trollies when outside temperatures are below 32 degrees Fahrenheit.

11. The washing system as described in claim 10, wherein said radiant heating system comprises circulating antifreeze through copper tubing which is encased in silicon and wherein said copper tubing is protected by enclosing said copper tubing with an aluminum shield.

12. The washing system as described in claim 1, wherein said system further comprises a plurality of optical sensors for sensing the length of a vehicle and wherein said optical sensors activate one of a plurality of proximity switches, said proximity switches halting the movement of said cross trolley when said cross trolley reaches the end of said vehicle so that said spray arm is in close proximity to the rear end of said vehicle for thorough washing.

13. The washing system as described in claim 1, wherein said vehicle to be washed is in a stationary position while said washing system is in operation.

14. The washing system as described in claim 1, and further comprising a switch activated by one of the tires of said vehicle, said switch thereby activating said washing system.

15. The washing system as described in claim 1, wherein said system is controlled by a programmable controller.

16. An automatic washing system suitable for washing vehicles in extreme weather conditions comprising:
a trolley system below which one of said vehicles to be washed is positioned, said trolley system comprising an overhead stationary linear trolley having proximal and distal ends and a cross trolley having proximal and distal ends transversely mounted thereto;
said linear trolley having driving means associated therewith for driving said cross trolley reciprocally between said distal and proximal ends thereof;
said cross trolley having a glider plate mounted thereto wherein said glider plate has a spray arm rotatably connected to said glider plate, said cross trolley further having driving means associated therewith for driving said glider plate reciprocally between said proximal and distal ends of said cross trolley and in perpendicular relation to said linear trolley;
said spray arm traveling the length of said vehicle as said cross trolley is driven reciprocally between said distal and said proximal ends of said linear trolley, said spray arm traveling the width of said vehicle as said glider plate is driven reciprocally between said proximal and said distal ends of said cross trolley, and wherein said spray arm is rotated ninety degrees as said spray arm reaches the corners of said vehicle;

said cross trolley further comprising fluid connector means between said proximal end of said cross trolley and said glider plate, said fluid connector means comprising a first swivel connect fixedly attached to said proximal end of said cross trolley, a second swivel connect fixedly attached to said glider plate and a connection therebetween, wherein said connection provides flexibility and rigidity as said glider plate travels between said proximal and distal end of said cross trolley, and wherein said first swivel connect is further connected to a primary supply hose for supply of soap and water to said spray arm for washing said vehicle.

17. The washing system as described in claim 16, wherein said spray arm comprises a length of metal tubing constructed and arranged in an inverted L-shape, and having a vertical bar member and a horizontal bar member wherein each of said bar members has a plurality of apertures disposed thereon for spraying said soap and water on said vehicle.

18. The washing system as described in claim 16, wherein said system further comprises a plurality of optical sensors for sensing the length of said vehicle and wherein said optical sensors activate one of a plurality of proximity switches, and wherein said proximity switch halts the movement of said cross trolley when said cross trolley reaches the end of said vehicle so that said spray bar is in close proximity to the rear end of said vehicle for thorough washing.

19. An automatic washing system suitable for washing vehicles in extreme weather conditions comprising:
   a trolley system below which one of said vehicles to be washed is positioned, said trolley system comprising an overhead stationary linear trolley having proximal and distal ends and a cross trolley having proximal and distal ends transversely mounted thereto;
   said linear trolley having driving means associated therewith for driving said cross trolley reciprocally between said distal and proximal ends thereof;
   said cross trolley having a glider plate mounted thereto wherein said glider plate has a spray arm rotatably connected to said glider plate, said cross trolley further having driving means associated therewith for driving said glider plate reciprocally between said proximal and distal ends of said cross trolley and in perpendicular relation to said linear trolley;
   said spray arm comprising a length of metal tubing constructed and arranged in an inverted L-shape having a vertical bar member and a horizontal bar member wherein each of said bar members has a plurality of apatures therein for spraying soap and water on said vehicle; and
   wherein said spray arm travels the length of said vehicle as said cross trolley is driven reciprocally between said distal and said proximal ends of said linear trolley, wherein said spray arm travels the width of said vehicle as said glider plate is driven reciprocally between said proximal and said distal ends of said cross trolley and wherein said spray arm is rotated ninety degrees as said spray arm reaches the corners of said vehicle;
   said cross trolley further comprising fluid connector means between the proximal end of said cross trolley and said glider plate, said fluid connector means comprising a first swivel connect fixedly attached to said proximal end of said cross trolley, a second swivel connect fixedly attached to said glider plate and a connection therebetween, wherein said connection provides flexibility and rigidity as said glider plate travel between said proximal and distal ends of the said cross trolley, and wherein first swivel connect is further connected to primary supply hose for supply of soap and water to said spray arm for washing said vehicle.

20. The washing system as described in claim 19, wherein said water is supplied to said spray bar on low pressure during periods of inoperation to prohibit said apertures from freezing shut when outside temperatures are below 32 degrees Fahrenheit.

* * * * *